(12) United States Patent
Happel

(10) Patent No.: US 10,681,896 B2
(45) Date of Patent: Jun. 16, 2020

(54) TEAT CUP LINER AND VENT

(71) Applicant: INRAD Technologies B.V., Wijchen (NL)

(72) Inventor: Werner Happel, Friesenried (DE)

(73) Assignee: INRAD Technologies B.V., Wijchen (NL)

(*) Notice: Subject to any disclaimer, the term of this patent is extended or adjusted under 35 U.S.C. 154(b) by 0 days.

(21) Appl. No.: 15/030,001

(22) PCT Filed: Oct. 17, 2014

(86) PCT No.: PCT/EP2014/072330
§ 371 (c)(1),
(2) Date: Apr. 15, 2016

(87) PCT Pub. No.: WO2015/055821
PCT Pub. Date: Apr. 23, 2015

(65) Prior Publication Data
US 2016/0270361 A1 Sep. 22, 2016

(30) Foreign Application Priority Data

Oct. 18, 2013 (DE) .................. 10 2013 111 544
Dec. 30, 2013 (DE) .................. 10 2013 114 987

(51) Int. Cl.
*A01J 7/02* (2006.01)
*A01J 5/08* (2006.01)

(52) U.S. Cl.
CPC ............. *A01J 7/025* (2013.01); *A01J 5/08* (2013.01)

(58) Field of Classification Search
CPC ........ A01J 7/02; A01J 7/04; A01J 7/08; A01J 7/022; A01J 7/025; A01J 5/003; A01J 5/007; A01J 5/017; A01J 5/06

USPC .......... 119/14.36, 14.47, 14.48, 14.49, 14.5, 119/14.51, 14.52, 14.53
See application file for complete search history.

(56) References Cited

U.S. PATENT DOCUMENTS

| | | | | |
|---|---|---|---|---|
| 3,071,272 A | * | 1/1963 | Doner .................. | A61J 7/0023 215/11.1 |
| 3,476,085 A | * | 11/1969 | Noorlander ............... | A01J 5/08 119/14.36 |
| 4,143,787 A | * | 3/1979 | Walker .................... | A47J 27/09 137/467 |
| 4,441,454 A | | 4/1984 | Happel | |
| 4,651,676 A | * | 3/1987 | Kupres .................... | A01J 5/08 119/14.47 |
| 4,756,852 A | * | 7/1988 | Temus ..................... | G21F 5/00 215/261 |

(Continued)

FOREIGN PATENT DOCUMENTS

| | | |
|---|---|---|
| CN | 102655738 A | 9/2012 |
| DE | 1937122 | 4/1966 |

(Continued)

OTHER PUBLICATIONS

JP Office Action dated Sep. 25, 2018 in JP App. No. 2016-524527.
CN Search Report dated Apr. 20, 2018 in CN 201480057357.1.

*Primary Examiner* — Ebony E Evans
(74) *Attorney, Agent, or Firm* — Boyle Fredrickson S.C.

(57) ABSTRACT

The invention relates to a teat cup liner and a vent suitable for said teat cup liner. The vent consists of a highly elastic material which can be elastically deformed, thereby allowing dirt to be removed.

14 Claims, 9 Drawing Sheets

(56) References Cited

U.S. PATENT DOCUMENTS

| | | | | |
|---|---|---|---|---|
| 5,944,205 A * | 8/1999 | LaJoie | | A61J 9/04 |
| | | | | 215/11.5 |
| 6,055,931 A * | 5/2000 | Sanford, Jr. | | A01J 5/08 |
| | | | | 119/14.36 |
| 6,375,528 B1 * | 4/2002 | Neisen | | B63H 20/26 |
| | | | | 440/89 A |
| 7,293,527 B2 * | 11/2007 | Shin | | A01J 5/08 |
| | | | | 119/14.47 |
| 7,578,260 B2 * | 8/2009 | Shin | | A01J 5/08 |
| | | | | 119/14.01 |
| 8,056,505 B2 * | 11/2011 | Laney | | A01J 5/08 |
| | | | | 119/14.47 |
| 8,176,872 B2 * | 5/2012 | Crespo | | A01J 5/044 |
| | | | | 119/14.36 |
| 8,627,785 B2 * | 1/2014 | Grace | | A01J 5/08 |
| | | | | 119/14.36 |
| 8,657,148 B2 * | 2/2014 | Krammes | | A47G 19/2272 |
| | | | | 215/388 |
| 2010/0288776 A1 * | 11/2010 | Bodum | | A47J 41/0077 |
| | | | | 220/592.2 |

FOREIGN PATENT DOCUMENTS

| | | |
|---|---|---|
| DE | 102004019728 | 11/2005 |
| DE | 102006026271 | 11/2007 |
| DE | 102006040079 | 3/2008 |
| DE | 102007053230 | 5/2009 |
| DE | 102008027277 | 12/2009 |
| EP | 1219166 | 7/2002 |
| EP | 1119235 | 2/2004 |
| GB | 190007524 A * | 4/1901 |
| GB | 644168 | 10/1950 |
| JP | 2010270829 | 12/2010 |
| JP | 2012047297 | 3/2012 |

* cited by examiner

TEAT CUP LINER AND VENT

BACKGROUND OF THE INVENTION

Field of the Invention

The invention relates to a teat cup liner according to the preamble of claim 1 and to a vent suitable for such teat cup liner.

Description of Related Art

A generic teat cup liner is known, for example, from the patent family DE 10 2006 026 271 A1 and from the additional applications DE 10 2006 040 079 A1 and DE 10 2007 053 230 A1.

Each of these documents discloses a teat cup liner including a teat cup liner head which has an inserting opening for a teat. A hose part for receiving the teat is connected to the teat cup liner head. The teat cup liner head is configured to include a head sleeve which in the mounted state encompasses a teat cup the other end portion of which is adjacent to a tensioning bead of the hose part so as to apply tension to the teat cup liner.

The basic arrangement of such teat cup liner with respect to the teat cup is disclosed in the documents EP 1 119 235 B1 and EP 1 219 166 A2.

In the prior art cited in the beginning in the teat cup liner head an air inlet vent is formed via which an interior headspace is ventilated toward the atmosphere. Said ventilation ensures that no excessive vacuum is allowed to form in the teat cup liner head. The known advantages for the air inlet during milking at the teat cup liner are, inter alia, better milk transport and no back spraying from the manifold. Moreover, the desired vacuum relief is brought about by the combination with the animal-appropriate relief system developed by applicant in the massaging phase by the supplied air.

It is a problem with solutions of this type that the air inlet vent has a relatively small orifice diameter of about 0.6 to 1.0 mm. There is a risk of said vent orifice getting blocked during milking e.g. by the contact with the udder or with skin folds and stopping proper functioning. When using milking units of this kind, after each milking operation it has to be ensured that during usual cleaning of the teat cup liners also the air inlet vent is cleaned. This may be done, for example, manually by spray-washing or brushing the vent mouth.

DE 10 2008 027 277 A1 suggests a solution in which a flushing cap is attached to the teat cup liner head for cleaning a teat cup liner so that the interior headspace encompassed by the teat cup liner head as well as circumferential areas of the teat cup liner can be cleaned by a cleaning liquid.

In said document to applicant it is suggested to design the flushing cap to include a peripheral sealing lip for sealing the circumferential area of the teat cup liner to the outside so that the interior headspace and/or the respective outer circumferential portion of the teat cup liner head can be cleaned. With this solution the vent is positioned such that it is located in the space closed off by the sealing lip so that, when the teat cup liner is being cleaned, the vent is flushed and thus cleaned as well.

However, it turned out that the vent may also get blocked already during the milking operation so that before the afore-described flushing by the flushing cap manual cleaning has to be carried out to ensure the proper functioning of the milking unit. With the known teat cup liners the milker makes use of a type of nail in order to open the vent cross-section. This is relatively complicated to carry out during the milking operation and requires a lot of experience.

SUMMARY OF THE INVENTION

Compared to this, the object underlying the invention is to provide a teat cup liner comprising an air inlet vent in which the air inlet vent can be cleaned with little effort. Furthermore, the object underlying the invention is to provide an appropriate vent.

This object is achieved by a teat cup liner comprising the features of the claims. As regards the vent, the invention is achieved by the features of the claims.

Advantageous developments of the invention are the subject matter of the subclaims.

In accordance with the invention, a vent made of elastic material which projects from the outer contour of the teat cup liner or, in other words, cantilevers therefrom is formed at a teat cup liner head of a teat cup liner. Said cantilever on the one hand guarantees easy accessibility, and, on the other hand, the use of an elastic material permits cleaning or stripping of the depositions by a finger/fingernail without any further aids. The elastic material is chosen so that at least the cantilevering area of the vent can be manually deformed elastically during cleaning so that the dirt/incrustations can be easily detached.

In an especially preferred embodiment of the invention the vent is arranged in an area in which a flushing cap is attached for cleaning the teat cup liner so that the dirt of the vent is "stripped off" by said attaching operation. Said stripping is assisted by the design of the vent made of the elastic material and the accompanying deformation.

Usually flushing caps of this type are designed to include a sealing edge or sealing lip which upon attachment then gets into direct stripping contact with the vent made of elastic material.

In a preferred embodiment of the invention the vent is arranged in the area of the largest periphery of the teat cup liner head so that, on the one hand, the vent cannot be covered by the udder or skin folds during milking and, on the other hand, it is within easy reach for the milker so that he/she can deform (churn) the vent by the finger so as to detach possible residual dirt. On the other hand, said positioning in the area of the maximum periphery ensures that the flushing cap gets into mechanical contact with the cantilevering end portion of the vent.

It is especially preferred in this context when the vent is arranged to be offset toward the hose part relative to the maximum enveloping circle/cylinder of the teat cup liner head.

In one embodiment it is preferred when the vent is retained to be exchangeable in the teat cup liner.

It is especially simple to insert and position the vent, when the latter includes two positioning flanges being spaced from each other, with the distance thereof corresponding approximately to the wall thickness of the teat cup liner head in this area so that the teat cup liner wall extends between the two positioning flanges and hence the vent is reliably positioned in place.

In such embodiment it is preferred when the external positioning flange is designed to be e.g. conical or rounded toward the end portion of the vent, i.e. to the vent orifice thereof.

Preferably a countersunk flange seat is formed on the outer wall of the teat cup liner head so that the seat, for example the external positioning flange is appropriately countersunk so that the vent cannot slip or be pulled out when the flushing means is attached. The countersinking may be approximately 0.5 to 1.5 mm.

The positioning of the vent can be further improved when the vent is fixed in the teat cup liner head by means of a plug-in sleeve.

The manufacture of the teat cup liner is especially simple when the vent is formed integrally with the teat cup liner.

In accordance with the invention, it is preferred when said vent is made of silicone or a comparable material. The Shore A hardness should be within the range of from 50 to 70, preferably 60 (determined according to the Shore A hardness test method).

Hence, according to the invention a teat cup liner is provided which:

does not get stained during milking, cannot be blocked by the udder or skin folds during milking, is easy to clean mechanically by the finger without using any tools and is cleaned during each flushing operation in all common flushing adapters.

Further advantages of the invention are perceived in:

the highly elastic vent for the air inlet having an outwardly bulged dome (end portion) and an integrated bore, preferably at the highest point (crest of the dome), use of a highly elastic material, preferably silicone, positioning of the vent in the teat cup liner such that upon regular attachment to the flushing means (flushing cap) mechanical deformation is imparted to the elastic outwardly bulged dome ensuring that the vent bore remains opened and possibly present dirt particles are detached, lowering the vent in the way that only the dome contacts the cleaning means so that the vent can be prevented from slipping out of the teat cup liner, an alternative configuration of the vent integrally with the teat cup liner and the dome-shaped configuration of the vent so that it can be cleaned or controlled by the finger or fingernail also during milking.

The vent for such teat cup liner is preferably configured to have a stepped inner diameter which enables the vent to be inserted into the teat cup liner by means of a tool without damaging the vent crest/vent dome.

As explained, the fastening may be improved by an additional plug-in sleeve which is preferably made of metal.

These and other features and advantages of the invention will become apparent to those skilled in the art from the following description and the accompanying drawing. It should be understood, however, that the detailed description and specific examples, while indicating a preferred embodiment of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Hereinafter the invention shall be illustrated in detail by way of schematic drawings, in which.

DETAILED DESCRIPTION OF THE DRAWINGS

Figure 1:
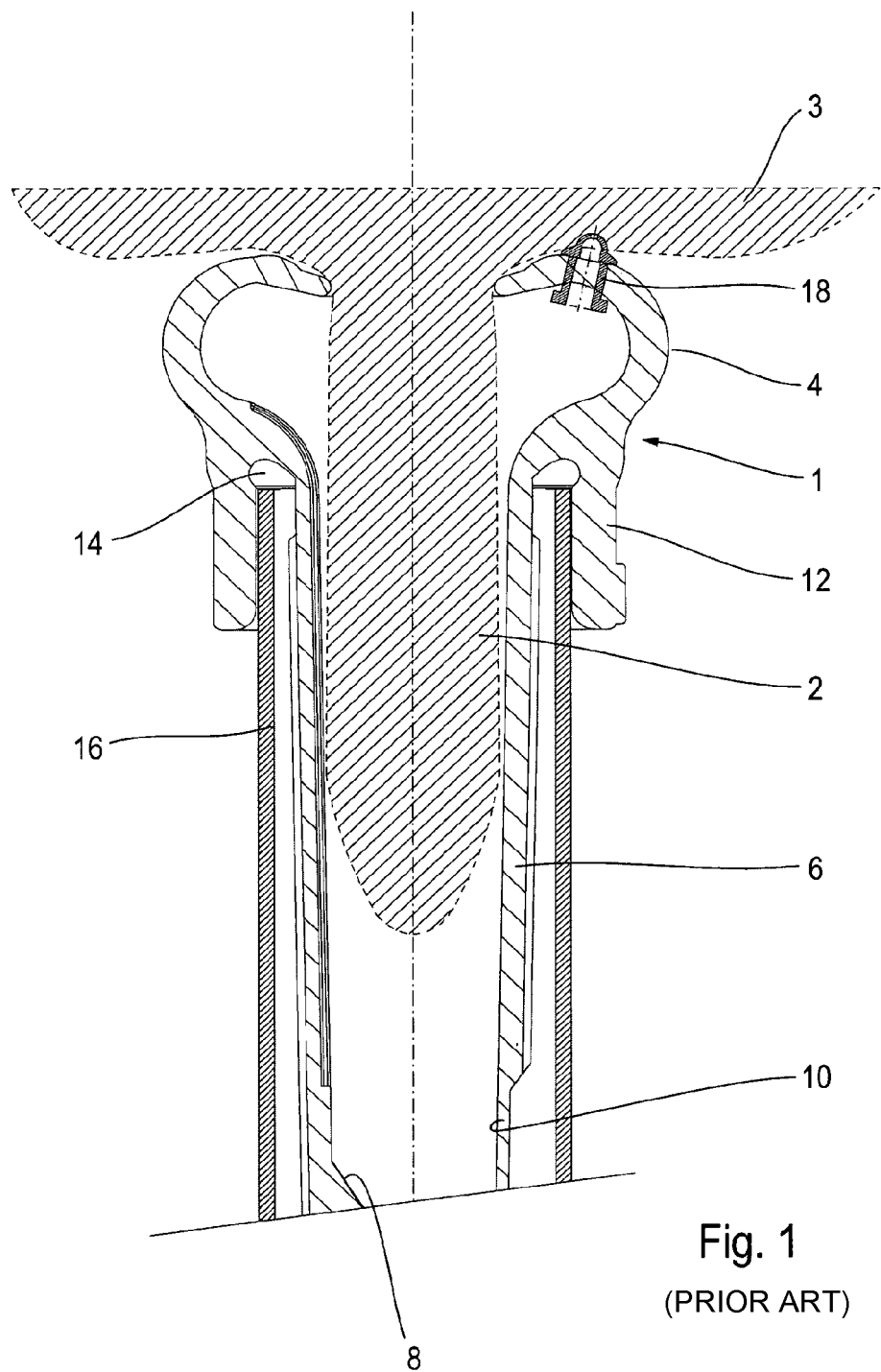
FIG. 1 shows a teat cup liner head known from prior art.

FIG. 1 illustrates part of a longitudinal section across a conventional teat cup liner 1 which is attached to a teat 2 of an udder 3. The teat cup liner 1 includes a teat cup liner head 4 which merges into a teat cup liner shaft 6 of a hose part reduced in diameter. The teat cup liner 1 moreover is designed to include a slanted end 8 which in the relief stroke produces a sealing to the vacuum by a folding thin-walled area 10 of the teat cup liner 1. Details of this conception are illustrated in EP 1 119 235 and in EP 1 219 166.

A flange-type head sleeve 12 forming with the outer periphery of the teat cup liner shaft 6 an annular space 14 into which an end portion of a cup sleeve 16 immerses is formed in the transition zone between the teat cup liner head 4 and the teat cup liner shaft 6. Said cup sleeve is—as explained in the beginning—with its other end portion not visible in FIG. 1 in contact with a tensioning bead of the teat cup liner 1 so that the teat cup liner 1 is clamped in the milking cup sleeve 16. In the conventional solution in the teat cup liner head 4 pointing toward the udder 3 an air inlet vent is formed which will hereinafter be referred to as vent 18. The structure of the shown vent 18 per se corresponds to the solution according to the invention. FIG. 1 is merely intended to illustrate at which position vents—of any design—are usually arranged. In this representation it is visible that the vent 18 is covered by the udder 3 and thus there is the risk that, on the one hand, the vent orifice is sealed or else can be closed by means of dirt.

Figure 2:
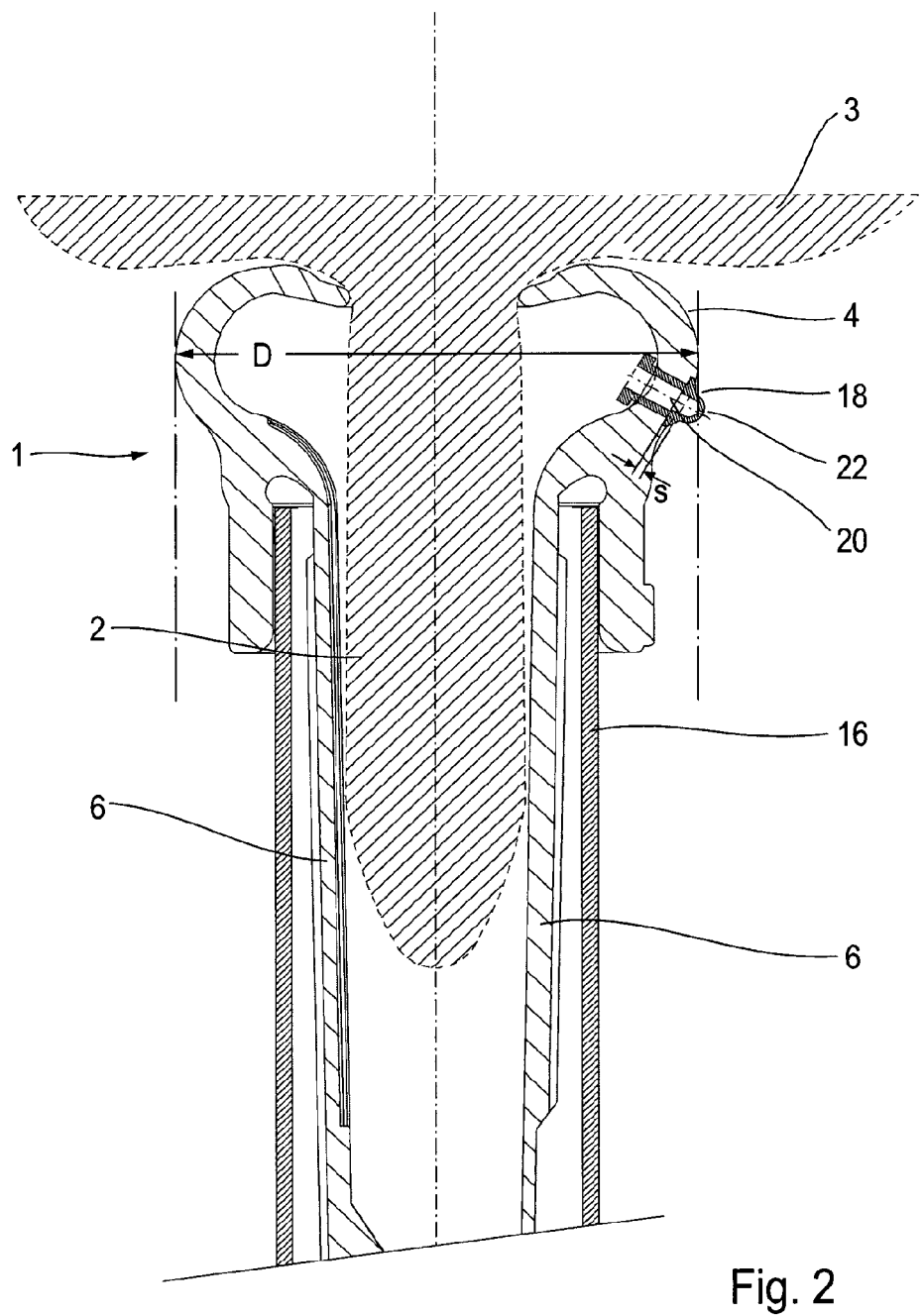
FIG. 2 shows a teat cup liner head according to the invention comprising a highly elastic vent.

FIG. 2 basically shows the same structure, wherein the vent now is positioned according to the invention. It is evident that the vent is arranged at a distance from the udder 3 approximately in the area in which the teat cup liner head 4 has its maximum diameter D. Concretely, in the representation according to FIG. 2 the vent 18 is arranged below said maximum outer diameter D of the teat cup liner head 4, i.e. arranged to be offset toward the teat cup liner shaft 6. An axis 20 of the vent 18 extends substantially at right angles with the teat cup liner wall.

As will be explained in detail in the following, said vent 18 has a dome-shaped dome 22 in which the vent bore is formed. The crest of said dome 22 protrudes from the outer periphery of the teat cup liner 1. In other words, the crest of the dome 22 extends outwardly beyond the enveloping cylinder of the teat cup liner head 4 indicated in broken lines having the diameter D in the radial direction. This ensures that said dome 22 is easily accessible for cleaning. The concrete structure of the vent 18 will hereinafter be illustrated in detail.

Figure 3:
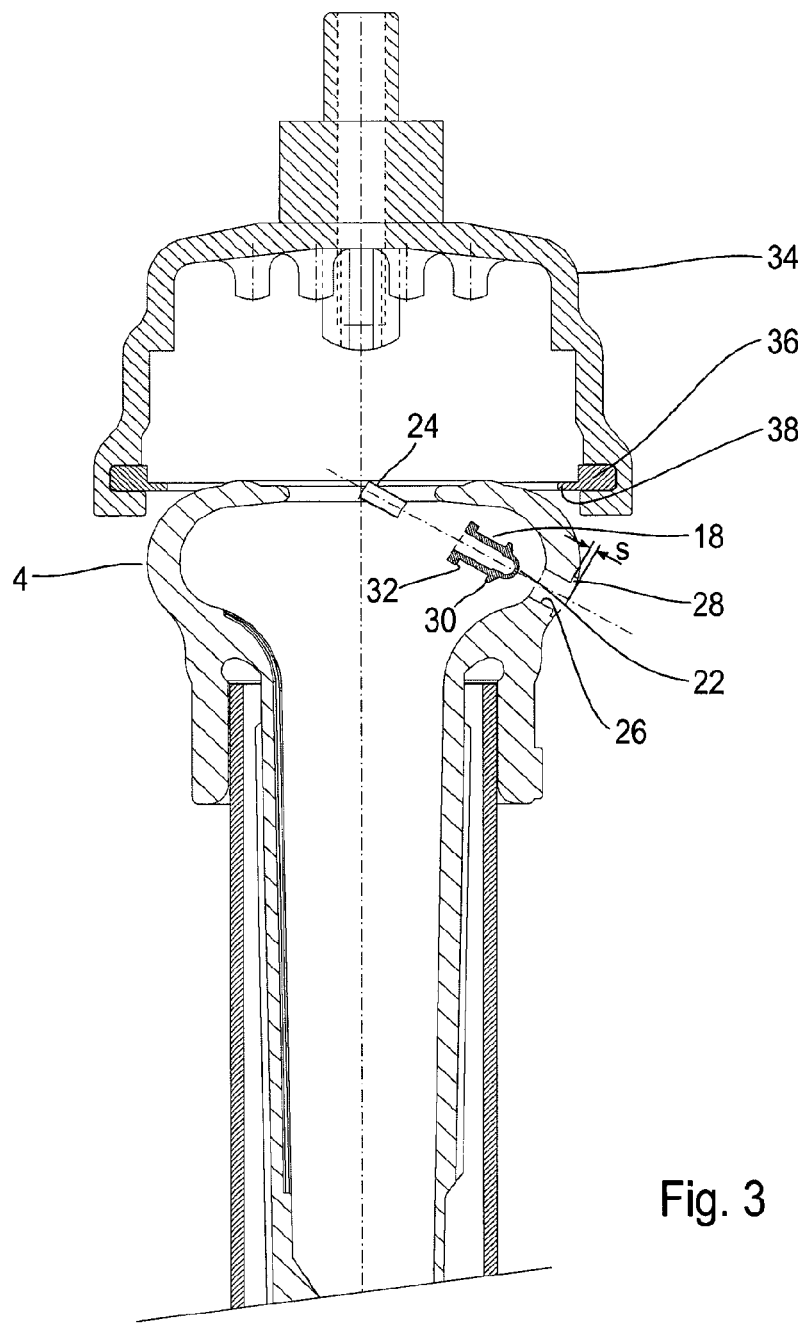
FIG. 3 shows an embodiment of the teat cup liner head from FIG. 2 comprising a plug-in sleeve.

FIG. 3 shows a variant in which the vent 18 is fixed by means of a metallic plug-in sleeve 24. In the teat cup liner wall a receiving bore 26 is formed which is extended outwardly into a flange seat 28. The latter is shaped so that the vent seat is somewhat countersunk into the teat cup liner head wall and thus the vent cannot inadvertently get out of place or be pulled out when a flushing means/flushing cap is attached. The countersinking depth s preferably is between 0.5 and 1.5 mm. The vent 18 includes—as will be explained in detail in the following—two positioning flanges 30, 32 spaced apart from each other, wherein the dome-side positioning flange 30 conically merges into the dome 22. The flange seat 28 is designed so that it receives the positioning flange 30 at least in portions and the latter is countersunk as described above.

The vent 18 (this is applicable to all embodiments) is made of highly elastic material, for example silicone having a Shore A hardness of approx. 60, and can thus be inserted very easily into the receiving bore 26 by elastic deformation. After that the metallic plug-in sleeve 24 is inserted for fixation so that the two positioning flanges 30, 32 are arranged on both sides of the teat cup liner wall and the outer periphery of the vent 18 is pretensioned against the peripheral wall of the receiving bore 26 by surface pressure. This mounting position is represented in FIG. 4.

Figure 4:
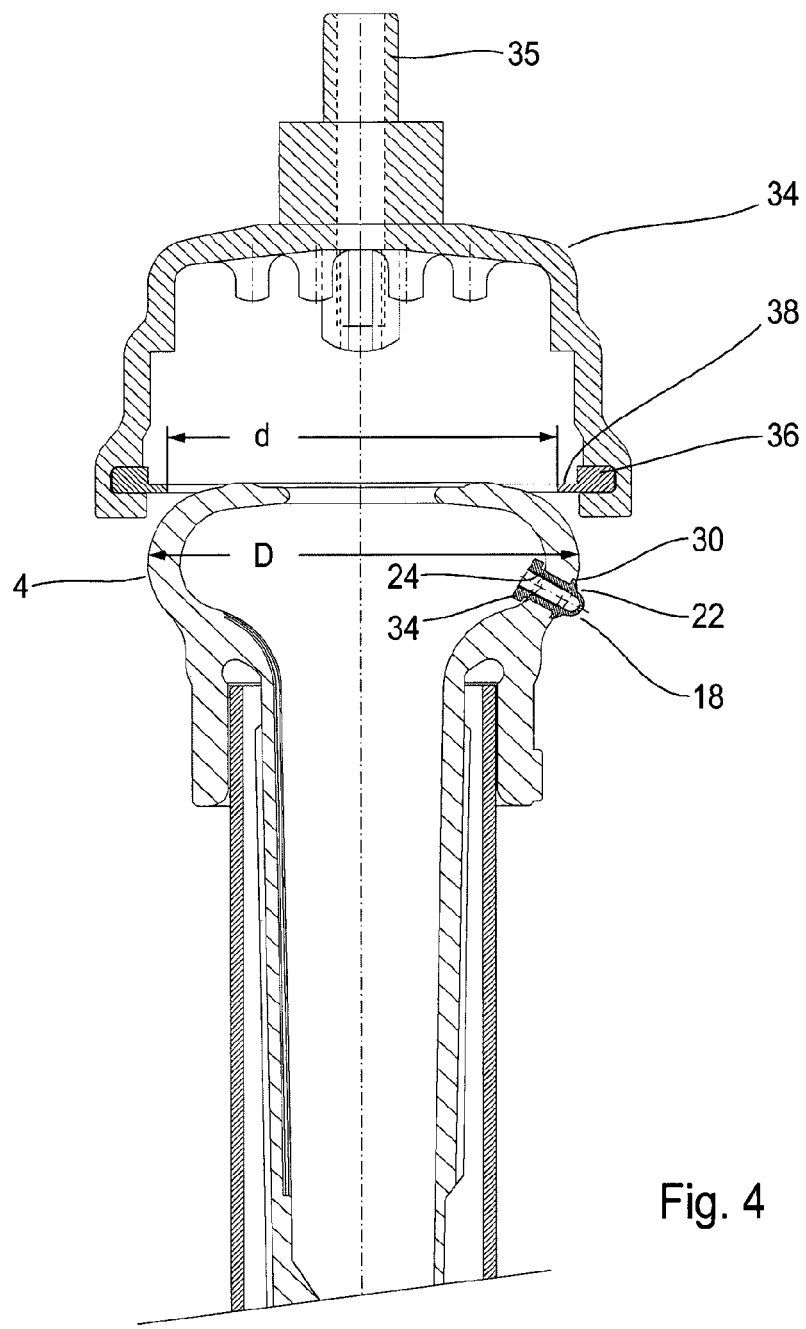
FIG. 4 shows the embodiment according to FIG. 3 in the mounted state.

FIGS. 3 and 4 also illustrate a section of a flushing cap 34 which may be, for example, a standard flushing cap or a Clearwash flushing cap. Said flushing cap 34 is connected to a cleaning device of the milking system via a hose connection 35 and a hose (not shown). In the inner circumferential area of the flushing cap 34 a peripheral sealing 36 including a sealing lip 38 is formed which is in sealing contact with the outer circumferential area of the teat cup liner head 4 when the flushing cap is attached. The inner diameter d of the sealing lip 38 is smaller than the diameter D of the teat cup liner head 4 so that, when the flushing cap 34 is attached, the sealing lip 38 is pretensioned to slide over the dome 22 of the vent 18 and thus to mechanically strip off depositions/dirt and to elastically deform at least the dome 22.

Figure 5:
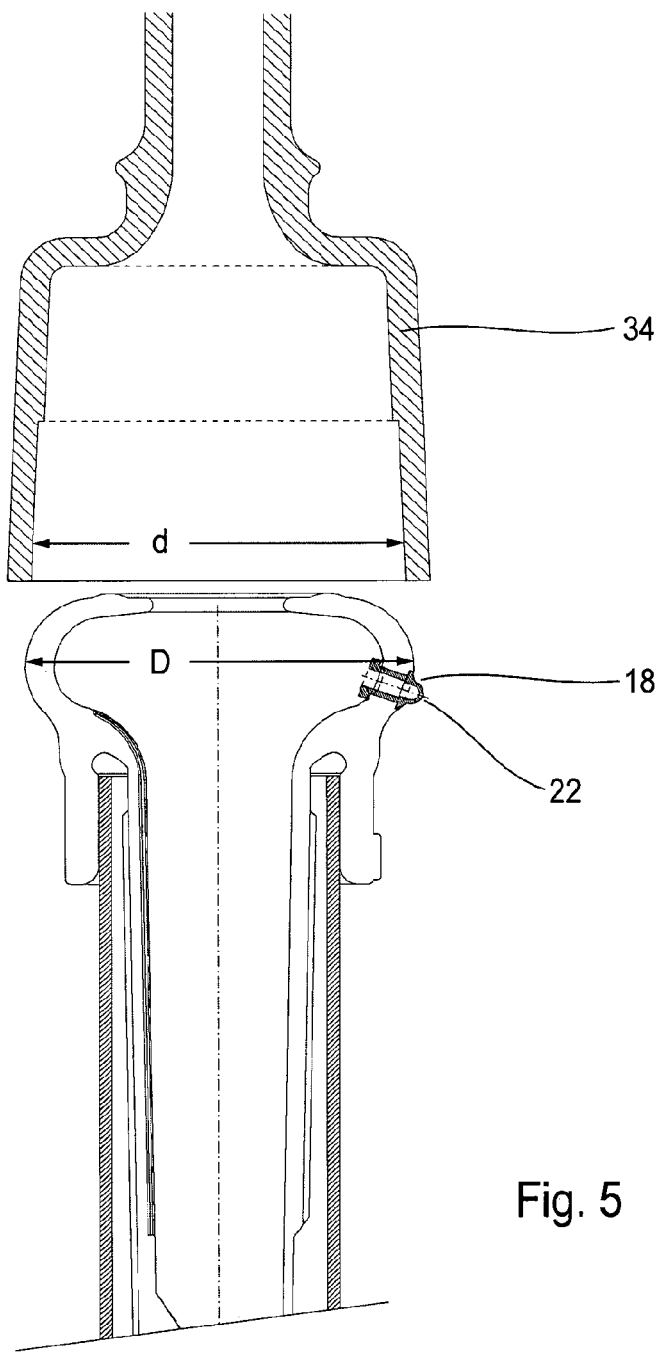
FIG. 5 shows an embodiment with a vent position suited for radial sealing by means of a standard flushing cap.

FIG. 5 shows the constellation according to FIG. 4 when a standard flushing cap 34 configured without any sealing is attached. It is evident that in this case the inner diameter d of the flushing cap 34 is selected so that it gets into stripping contact with the dome 22 of the vent 18 as well. Accordingly, the diameter d is selected to be equal to or somewhat smaller than the outer diameter D of the teat cup liner head 4.

Figure 6:
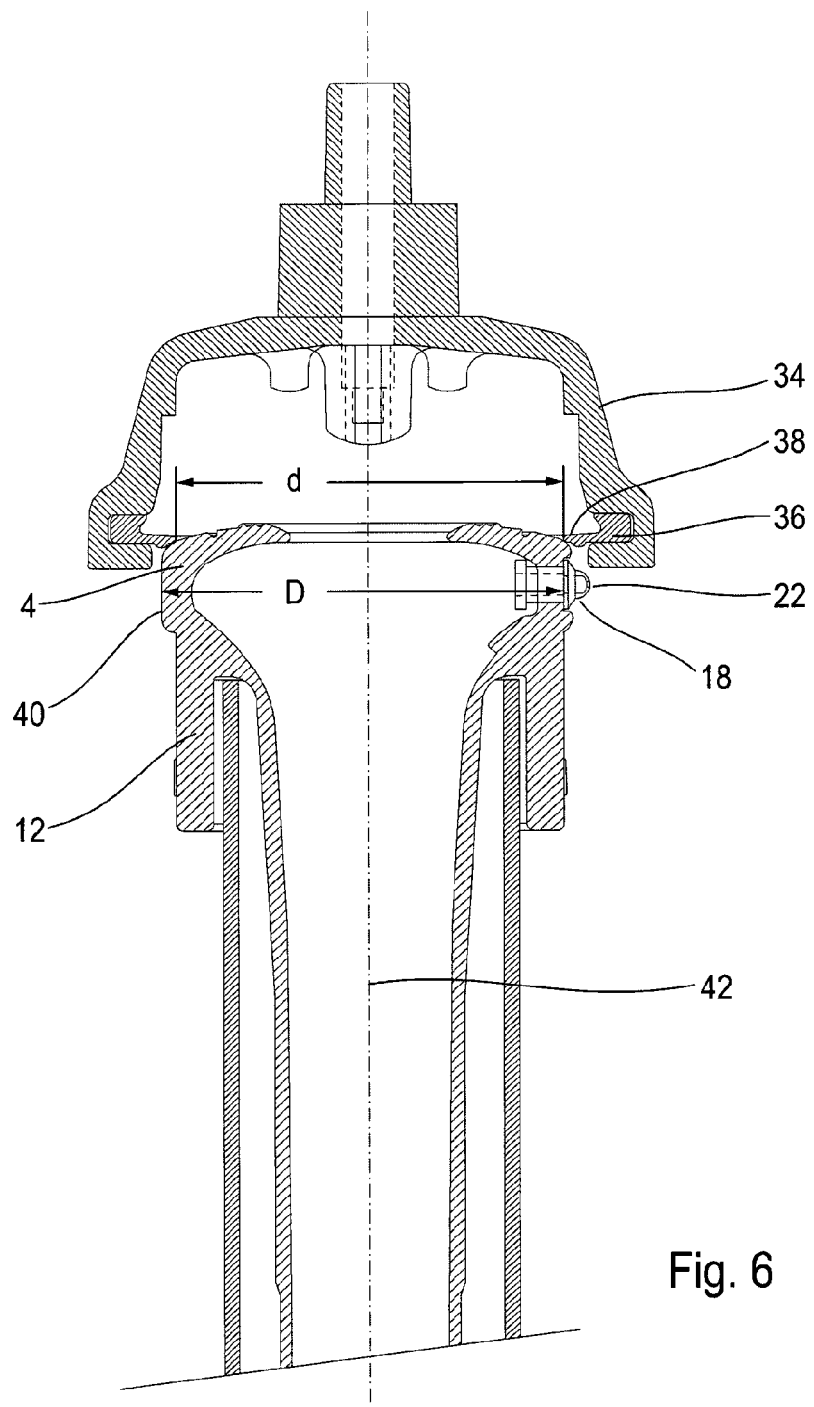
FIG. 6 shows an embodiment of the invention with a vent position suited for a Clearwash flushing adapter.

FIG. 6 illustrates a constellation in which the flushing cap 34 is in the form of a Clearwash flushing cap having a geometry that is somewhat different from that of the afore-described flushing caps 34. A teat cup liner head 4 suited for such system may be configured to include an approximately cylindrical shell portion 40 to which the head sleeve 12 which, in the broadest sense, is equally ring-cylindrical is connected while being slightly stepped back. In the cylindrical shell portion 40 the vent 18 is included which is arranged, instead of being inclined as in the afore-described embodiments, in the radial direction relative to the teat cup liner axis 42. The flushing cap 34 shown in FIG. 6 equally includes a sealing 36 having a sealing lip 38 whose inner diameter d is somewhat smaller than the outer diameter D of the cylindrical shell portion 40 so that, when the flushing cap 34 is attached, the sealing lip 38 gets into contact with the dome 22 of the vent 18.

Figure 7:
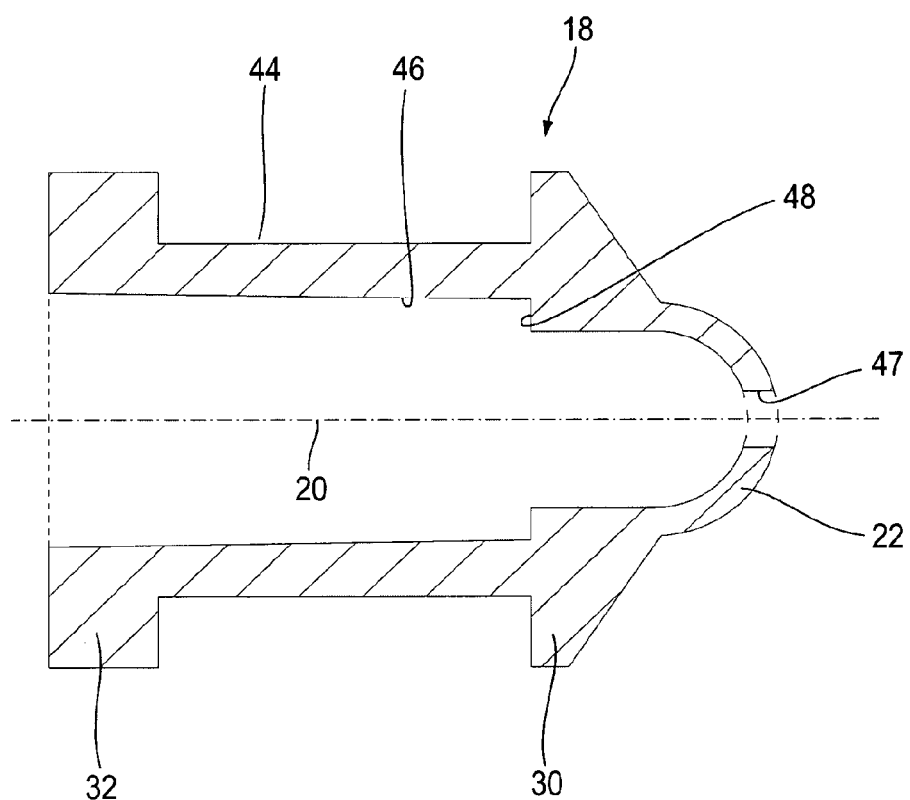
FIG. 7 shows a sectional view of a highly elastic vent for a teat cup liner according to the afore-described embodiments.

FIG. 7 illustrates a single representation of a preferred embodiment of a vent 18 according to the invention. As afore-explained, the vents 18 according to the invention are preferably made of highly elastic silicone. The material should have a Shore A hardness within the range of from 50 to 70, preferably a Shore A hardness of approx. 60.

The vent 18 shown in FIG. 7 has an approximately cylindrical base body 44 including the two positioning flanges 30, 32 protruding in the radial direction relative to the axis 20. The vent 18 includes a stepped vent bore 46 which is stepped back toward the rounded dome 22 of the vent 18. In said dome 22 the actual vent orifice 47 is formed having a diameter which is considerably smaller than that of the vent bore 46. The annular shoulder 48 formed by a radial step may serve, for example, as a stop face for the afore-explained plug-in sleeve 24. On principle, said annular shoulder 48 may also be used for supporting an insertion tool via which the vent 18 is inserted into the receiving bore 26 of the teat cup liner head 4. Since the diameter of the annular shoulder 48 is considerably larger than that of the vent orifice 47, the latter cannot be damaged during insertion.

The dome-side positioning flange 30 is designed to have a conical end face so that an almost continuous transition to the dome 22 is formed.

Said vent 18 may be manufactured e.g. by injection molding or the like.

Figure 8:
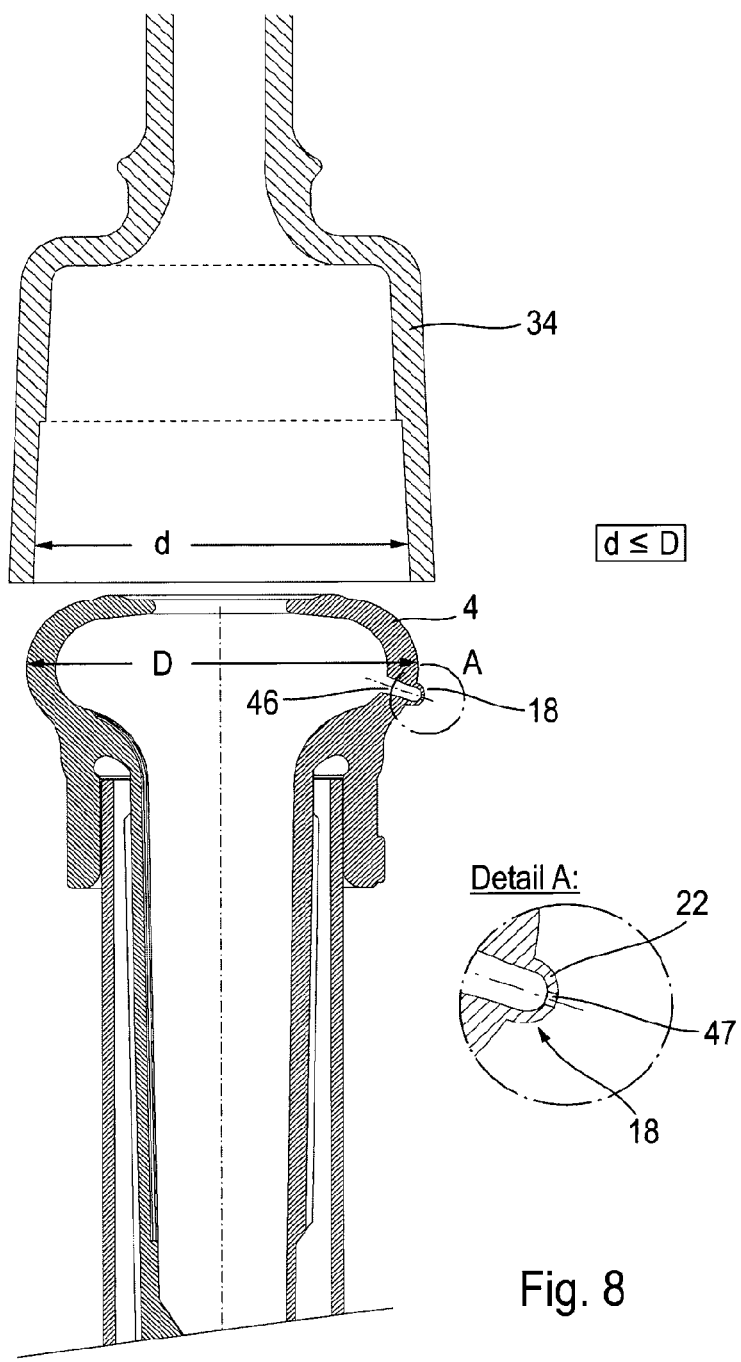
FIG. 8 shows a vent formed integrally with the teat cup liner.

FIG. 8 shows a strongly simplified embodiment comprising, for example, a standard flushing cap 34 and a vent 18 formed integrally on the teat cup liner head 4. The dome 22 of the vent 18 is formed by a membrane-type, bulged and highly elastic shell portion of the teat cup liner head 4. The vent orifice 47 opens into said dome 22. The vent bore 46, which in contrast is radially enlarged, is formed in the wall of the teat cup liner 4, according to FIG. 8. In such embodiment the mounting effort is reduced compared to the afore-described embodiment.

Figure 9:
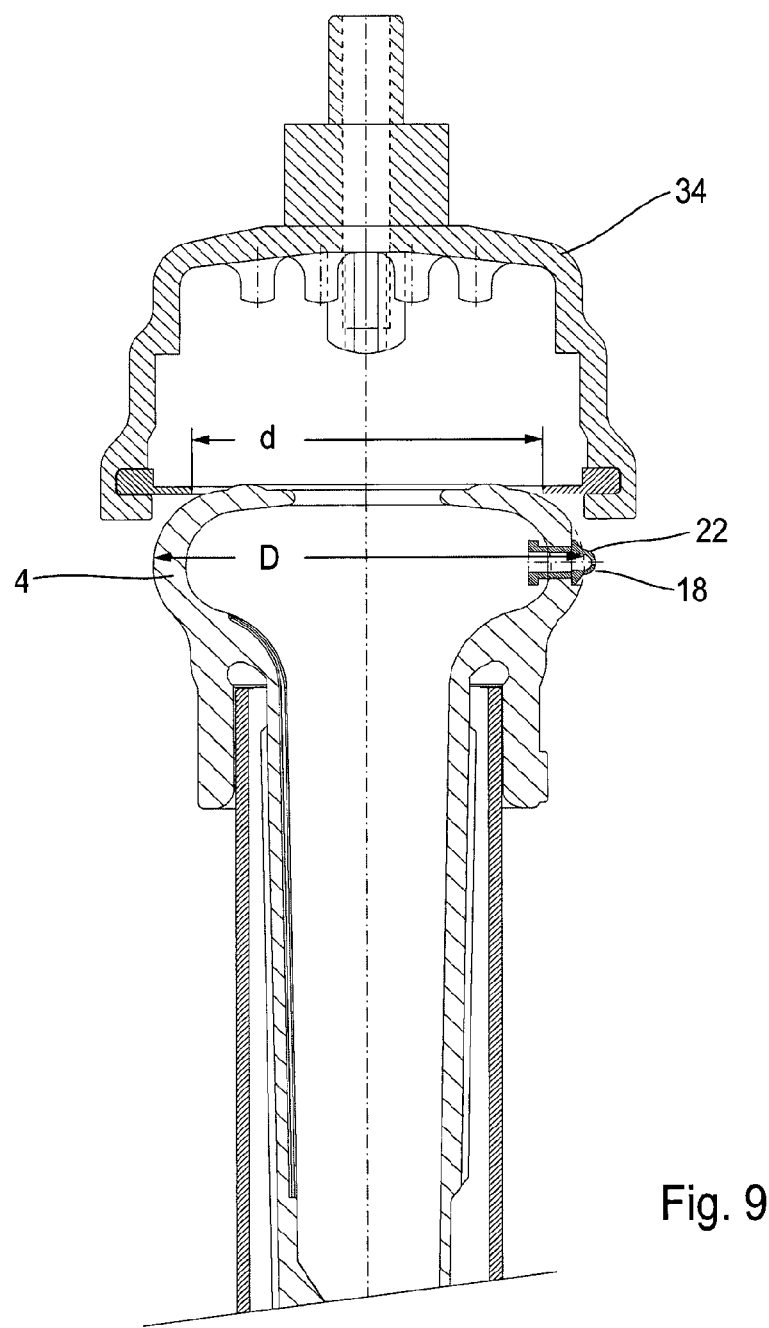
FIG. 9 shows another embodiment for a teat cup liner including a vent according to the invention.

In FIG. 9 a variant of the embodiment according to FIGS. 3 and 4 is illustrated. In contrast to these embodiments, in the variant according to FIG. 9 the vent 18 is arranged in the area exhibiting the maximum diameter D of the teat cup liner head 4. The flushing cap 34 is formed according to the embodiments of the FIGS. 3 and 4, for example. Accordingly, the diameter d of the sealing lip 38 is definitely smaller than the diameter D of the teat cup liner head 4 so that, when the flushing cap 34 is attached, impurities are stripped off the dome 22 of the vent 18. Said stripping may be accompanied, upon attaching the flushing cap 34, by an elastic deformation of the vent 18 according to the afore-described embodiments.

In the afore-described embodiments the vent 18 is manufactured of silicone. Basically, there may also be provided other materials which are relatively soft and elastic vis-à-vis the conventional solutions so that stripping/deforming is enabled in a simple manner.

The invention discloses a teat cup liner and a vent suitable for said teat cup liner. The vent consists of a highly elastic material which can be elastically deformed, thereby allowing dirt to be stripped off.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

The invention claimed is:

1. A teat cup liner comprising a teat cup liner head, and a vent, wherein the vent:
protrudes outwardly from the teat cup liner head beyond the teat cup liner head contour, is formed of a material which can be elastically deformed for cleaning so that the vent can be stripped off and deformed manually by a user's finger, and wherein the vent includes:

two positioning flanges spaced apart from each other between which part of the teat cup liner is received, with the two positioning flanges defining an inner flange arranged inwardly of the teat cup liner and an outer flange arranged outwardly of the teat cup liner;

a vent base body that connects the two positioning flanges and defines a bore therethrough;

a shoulder that extends radially inwardly with respect to the vent base body and the bore; and a protruding end portion of the vent is rounded to form a dome and in said dome a vent orifice is formed, with the dome extending from the outer flange and having a dome wall that is thinner than the outer flange.

2. The teat cup liner according to claim 1, further comprising a flushing cap, wherein the vent is arranged in an area in which the flushing cap is attached for cleaning the teat cup liner so that the vent can be stripped off and deformed also by attaching the flushing cap.

3. The teat cup liner according to claim 1, wherein the vent is arranged in an area of the maximum diameter (D) of the teat cup liner head.

4. The teat cup liner according to claim 3, wherein the vent protrudes from an enveloping cylinder of the teat cup liner head.

5. The teat cup liner according to claim 3, wherein a front end of the vent is offset towards a vertical axis of a teat cup liner shaft.

6. The teat cup liner according to claim 1, wherein the vent is exchangeable in the teat cup liner head.

7. The teat cup liner according to claim 6, wherein the vent includes two positioning flanges spaced apart from each other between which part of the teat cup liner is received.

8. The teat cup liner according to claim 7, wherein an external positioning flange is shaped conically, oriented towards the dome of the vent.

9. The teat cup liner according to claim 6, comprising a plug-in sleeve adapted for fastening the vent.

10. The teat cup liner according to claim 1, comprising a countersunk flange seat for a seat of the vent positioned on an outer wall of the teat cup liner head, for an external positioning flange, wherein the countersinking depth(s) is within the range of 0.5 mm to 1.5 mm.

11. The teat cup liner according to claim 1, wherein the vent is formed integrally on the teat cup liner head.

12. The teat cup liner according to claim 1, wherein the vent is made of silicone, having a Shore A hardness of from 50 to 70.

13. The teat cup liner according to claim 12, wherein the Shore A hardness is about 60.

14. The teat cup liner according to claim 1, wherein the vent is positioned and configured to allow the vent to be cleaned by using only a user's finger/fingernail to manually deform the vent without any further aids.

* * * * *